United States Patent [19]

Auracher et al.

[11] 4,134,640
[45] Jan. 16, 1979

[54] OUTPUT/INPUT COUPLER FOR MULTI-MODE GLASS FIBERS

[75] Inventors: Franz Auracher, Munich; Ralf Kersten, Rottach-Egern, both of Germany

[73] Assignee: Siemens Aktiengesellschaft, Berlin & Munich, Germany

[21] Appl. No.: 783,277

[22] Filed: Mar. 31, 1977

[30] Foreign Application Priority Data

Apr. 5, 1976 [DE] Fed. Rep. of Germany ....... 2614647

[51] Int. Cl.² ................................................ G02B 5/14
[52] U.S. Cl. ..................................... 350/96.15; 65/43; 350/347
[58] Field of Search ........ 350/96 C, 96 WG, 160 LC, 350/96.15, 96.17, 347; 65/43

[56] References Cited

U.S. PATENT DOCUMENTS

| 3,453,036 | 7/1969 | Swope et al. | 350/96 C |
| 3,663,194 | 5/1972 | Green | 350/96 T |
| 3,918,794 | 11/1975 | Milton | 350/96 C |
| 3,923,377 | 12/1975 | Milton | 350/96 C |

OTHER PUBLICATIONS

*Optics Communications,* vol. 18, No. 4, Sep. 1976 "Optical Tapping Element for Multimode Fibers" by Witte.

*Primary Examiner*—John K. Corbin
*Assistant Examiner*—Stewart Levy
*Attorney, Agent, or Firm*—Hill, Gross, Simpson, Van Santen, Steadman, Chiara & Simpson

[57] ABSTRACT

An output/input coupler for multi-mode glass fibers characterized by a substrate, a main line having at least one flat surface, and at least one branch line having one flat surface. The main line and branch line are arranged on the substrate with the flat surfaces being in spaced parallel facing relationship. Preferably, the main line has the square cross section and the flat surface of each branch line extends at an angle to the axis of the branch line so that the branch line has a wedge-shaped configuration in the plan view. A transparent material may be imposed in the space between the spaced parallel facing surfaces of the main and branch lines. This transparent material may be a liquid crystal material whose optical properties are changed by the application of an electric field created by a pair of electrodes which overlie the space between the parallel facing surfaces. The coupler is preferably formed by using a photolithographic process to form the coupler from a layer of photosensitive material which is disposed on the substrate. The photolithographic process includes exposing the photosensitive material utilizing a mask conforming to the shape and disposition of the main and branch lines, and developing the exposed material to leave the main and branch lines on the substrate.

13 Claims, 3 Drawing Figures

OUTPUT/INPUT COUPLER FOR MULTI-MODE GLASS FIBERS

BACKGROUND OF THE INVENTION

1. Field of the Invention

The present invention is directed to an output and input coupler for multi-mode glass fibers and the method of making the coupler.

2. Prior Art

In a glass fiber transmission system, it is often necessary to output couple a part of the optical power from a glass fiber at a specific point or to additionally input couple optical power into the glass fiber system. The output coupling of a part of the optical power of the system enables supplying a subscriber with a signal or to measure the signal level in the line. The input coupling enables a subscriber to feed a signal into the transmission lines.

Output and input couplers for groups of glass fibers are already known. Examples of these couplers are described in the following two publications: F. L. Thiel, "Topical Meeting On Optical Fiber Transmission", Jan. 7-9, 1975, Williamsburg, Virginia, U.S.A., Paper WE 1-1 and A. F. Milton, A. B. Lee, "Topical Meeting Of Optical Fiber Transmission", Jan. 7-9, 1975, Williamsburg, Virginia, U.S.A., Paper WE 2-1.

Another known type of glass fiber branch arrangement is a branching fiber core which is arranged within a common fiber cladding. This known branching arrangement could also be used as an output and input coupler. This known branch arrangement was produced by providing a preform having a branched core, and then drawing the preform to form the appropriate branched glass fibers. However, the production process to produce this type of branched glass fiber is relatively expensive.

SUMMARY OF THE INVENTION

The present invention is directed to providing output and/or input couplers which are simple to produce and which coupler also makes it possible to output couple a very small portion of the optical power of the system, for example only a few parts per thousand.

To accomplish this aim, the invention is directed to a coupler for use with multi-mode glass fibers to couple-out and couple-in a light signal to the glass fibers with the coupler comprising a substrate, a main line having at least one flat surface, at least one branch line having at least one flat surface, said main line and each branch line being disposed on the substrate with the flat surface of the branch line facing a flat surface of the main line in spaced parallel relationship thereto.

A common feature of the output/input coupler of the invention is that next to a main line which serves to conduct the main component of optical power, a branch line is arranged at a short distance therefrom. On account of the fact that the branch line and main line are closely adjacent to one another, stray light is coupled from the main line to the branch line. To facilitate this cross-coupling, the main line and branch line are designed as cladding-free light conductors in the cross-coupling zone.

In the cross-coupling zone, a medium, whose index of refraction is lower than the index of refraction of the main and branch lines, lies between the main line and the branch line. This medium can be air, for example. It is also possible to use a transparent adhesive, for example, adhesives with epoxide resin base such as Epotec 305.

In a preferred embodiment of the invention, a liquid crystal material is used as the transparent material. The liquid crystal material will change its optical properties under the influence of an electrical field and in particular it exhibits a birefringency which is dependent upon the electric field. By applying an artificial electric field by means of metallic electrodes to the liquid crystal material which is between the main line and the branch line, only light of a specific polarization direction, which is fundamentally dependent upon the direction of the electric field, will be coupled from the main line to the branch line.

If the difference in the index of refraction of the material between the main and branch line and the index of refraction of the main and branch lines is high, for example, if the medium has a considerably lower index of refraction than the material forming the branch and main lines, only high order modes are cross-coupled. In the event of a small difference between the index of refraction, lower order modes are also coupled over.

DESCRIPTION OF THE PREFERRED EMBODIMENT

Figure 1:
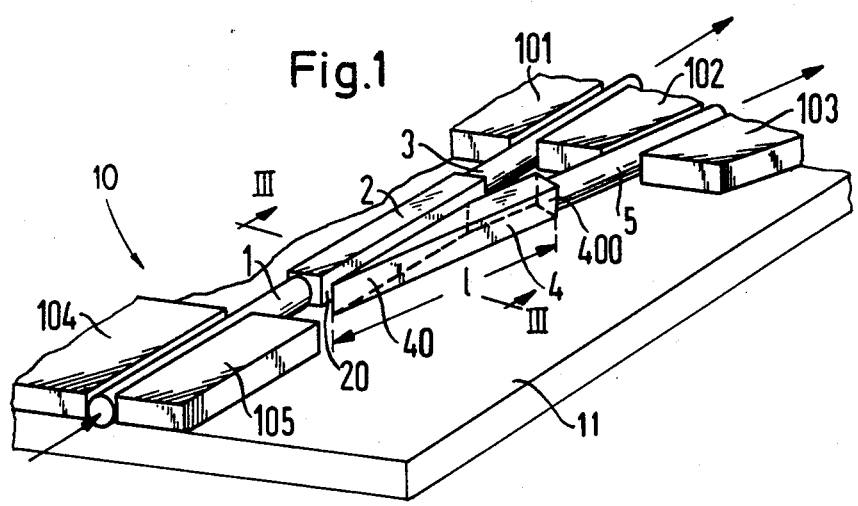
FIG. 1 is a perspective view with portions removed for purposes of illustration of a coupler in accordance with the present invention.

The principles of the present invention are particularly useful in a coupler generally indicated at 10 in FIG. 1. As illustrated, the coupler 10 has a substrate 11, a main line 2, which has at least one flat surface 20. As illustrated, the main line 2 receives light traveling in the direction of the arrows from an incoming light conducting fiber 1 and transfers the light to an outgoing light conductor fiber 3. The main line 2 preferably has a square cross section with the height and the width corresponding to the diameter of the light conducting fibers 1 and 3.

At a side of the main line 2, the coupler 10 includes a branch line 4 which extends to a branch light conducting fiber 5. The branch line 4 has at least one flat surface 40 which faces the flat surface 20 of the main line 2 and extends parallel thereto at a constant distance d therefrom.

Figure 2:
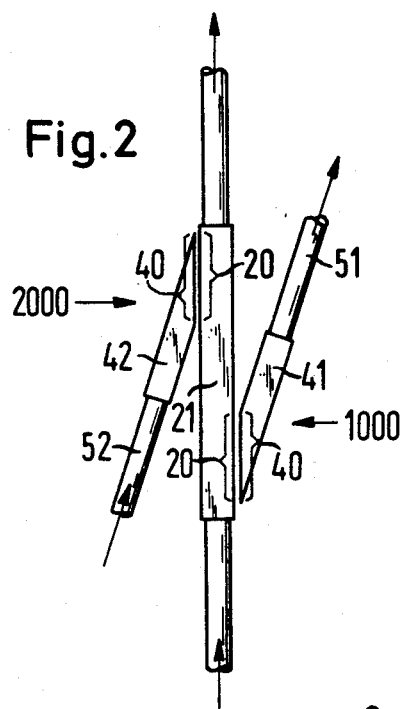
FIG. 2 is a plan view of an embodiment of a coupler in accordance with the present invention which coupler has both an input coupling and an output coupling.

As illustrated in FIGS. 1 and 2, the branch line 4 has a square abutting surface 400 for connection to the branch light conducting fiber 5 and the surface 40 extends at an angle to the axis of the branch line 4 so that the end adjacent the surface 40 has a wedge-shape in a plan view.

By selecting the distance d between the surfaces 20 and 40, it is possible to set the strength of the over-coupling. The greater this distance, the weaker the over-coupling.

In an exemplary embodiment, light conducting fibers having a diameter of approximately 100 $\mu$m were used. The main line possesses a length of approximately 1 mm and a square cross section with a thickness and width of approximately 100 $\mu$m that corresponds to the diameter of the light conducting fibers such as 1 and 3. The branch line 4 possesses an angle of approximately 1° at the tip of the wedge. The surface 40 of the branch line 4 which faces the surface 20 of the main line 2 extends parallel to surface 20 of the main line and possesses approximately the same dimensions as the surface 20. The length L of the branch line is approximately 1.5 mm. The distance d between the surfaces 20 and 40 is approximately 80 μm and thus approximately 0.5 to 1 part per thousand of the light power being conveyed in the main line 2 will be coupled into the branch line 4.

The main line 2 and branch line 4 may be formed on the substrate 11 by a photolithographic process on a layer or foil of light sensitive material. In such a process, a light sensitive synthetic foil, for example, a photosensitive foil sold under the tradename RISTON by Dupont Chemical Company, is applied on the substrate 11. Thereafter, the foil is exposed through a mask corresponding to the desired structure for the main line 2 and the branch line 4. In other words, the mask has the shape of the plan view of the main line and branch line. The thickness of the foil corresponds to the desired thickness for the main and branch lines. Following the exposure and development of the photosensitive foil or layer, only the main line 2 and branch line 4 will remain on the substrate 11. The remainder of the foil being eliminated during the development.

In glass fiber systems, glass fibers are generally held in place in guide grooves on a substrate. These guide grooves can likewise be produced photolithographically by applying a light sensitive foil layer on the substrate and then photolithographically producing the guide grooves in the foil or layer. It is possible to form the guide grooves at the same time as forming the main and branch lines. Thus, the main and branch lines as well as the guide grooves can be produced simultaneously using a single mask which has the shape which corresponds to a plan view of the guide grooves and also to the main and branch lines. In FIG. 1, the portions of the synthetic foil from which the guide grooves have been produced occupies positions 101–105 on the substrate 11.

Virtually any mechanically stable material which has an optical smooth surface can be used as the substrate 11. It is expedient that the substrate should be provided with a reflective coating or possess a definitely lower index of refraction than the glass fibers 1, 3 and 5 and the index of refraction of the main and branch lines 2 and 4.

As illustrated, the light conducting fibers 1, 3 and 5 abut against the end faces of the main line and the end face of the branch line, respectively. The reflection losses at these abutment points can be prevented by the utilization of an immersion fluid or by utilizing a non-reflecting coating on the abutting end faces.

The coupler can also possess a modified shape. For example, the branch line can possess the same shape as the main line. In such an instance, the two uncladded light conductors having a square cross section are arranged on the substrate to extend parallel to one another with the facing flat surfaces at a distance d.

In either the above-mentioned shape or the configuration illustrated in FIG. 1, a transparent material, for example acrylic glass, can be introduced in the space or gap between the facing flat surfaces of the main line and branch line.

Figure 3:
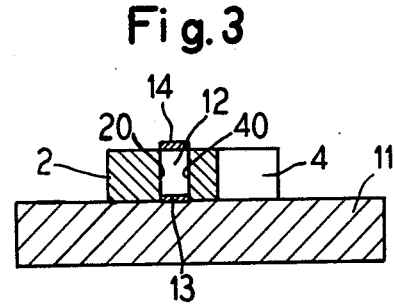
FIG. 3 is a cross-sectional view taken along line III—III of FIG. 1 illustrating an embodiment of the present invention.

It is also possible to introduce a liquid crystal material 12 in the space between the faces 20 and 40 (FIG. 3). To apply an electric field to the liquid crystal material 12, an electrode 13 can be arranged on the substrate 11 or can be arranged beneath the substrate 11. A second electrode 14 is provided on the main and branch lines. In either case, both electrodes 13 and 14 must cover the interspace between the surfaces 20 and 40 of the main and branch lines.

The coupler 10, illustrated in FIG. 1, can be used as both an input coupler or an output coupler. As an output coupler, it will operate as a functionally loss-free coupler, but on the other hand, when it is operated as an input coupler, losses will generally occur.

If the coupler 10 in FIG. 1 is to be used as an input coupler, the light will be applied in a direction which is opposite to the direction of the arrows. In other words, the light conducting fibers 3 and 5 are the incoming light conducting fibers and the light conductor fiber 1 is an outgoing light conducting fiber. Assuming that the incoming light conducting fibers possess a cross section $A_3$ and $A_5$ and have an acceptance angle $\theta_3$ and $\theta_5$ and the indices have been selected to correspond to the position numbers of the light conducting fibers, the outgoing light conducting fiber, which will be assumed to possess a cross section $A_1$ and an acceptance angle $\theta_1$ must fulfill the following conditions:

$$A_1 \sin^2\theta_1 \geqq A_3 \sin^2\theta_3 + A_5 \sin^2\theta_5,$$

for the input coupling to occur in a loss-free fashion.

Only in this case may the mode spectra of the incoming light conducting fibers be filled without fundamental losses being able to occur during the input coupling. This formula means that the number of modes capable of propagation in the light conducting fibers leaving the main line 2 is at least as big as the sum of the modes excited in the two other glass fibers.

However, since a practical light conducting fiber system generally only has one fiber type of a standard cross section, it is not possible to fulfill the above condition. However, a way of avoiding losses consists in that the mode spectrum of the incoming light conducting fiber, which opens into the main line 2, is not yet filled to the maximum number. Thus, it is still possible to input couple light power in a loss-free fashion until this maximum number of modes is reached.

As illustrated in FIG. 2, an output coupler 1000 can be combined with an input coupler 2000. In the device illustrated in FIG. 2, the light passes in accordance with the direction of the arrows so that light is first coupled out of a main line 21 by the output coupler 1000 and then additional light is coupled into the main line 21 by the input coupler 2000. If, at a maximum, the input coupler 2000 input couples as many modes as have been previously output coupled by the output coupler 1000, a loss-free input coupling is possible. It will be seen from the figure that the input coupler and the output coupler possess the same shape and their arrangement differs merely in respect to the direction of the light propagation. In FIG. 2, the output coupler 1000 possesses a branch line 41 which opens into a light conducting fiber 51. The input coupler 2000 has a branch line 42 to which a light conducting fiber 52 is connected. The main line 21 is, for example, common to both the couplers.

Although various minor modifications may be suggested by those skilled in the art, it should be understood that we wish to embody within the scope of the patent warranted hereon, all such modifications as reasonably and properly come within the scope of our contribution to the art.

We claim:

1. A coupler for use with individual multi-mode glass fibers to couple-out and couple-in a light signal to the individual glass fibers comprising a substrate, a main line having a pair of end faces and at least one flat surface therebetween, at least one branch line having an end face and a flat surface, said main line and each branch line being disposed on said substrate with the flat surface of the branch line facing a flat surface of the main line in spaced parallel relationship thereto, and portions on said substrate to form a guide groove adjacent each end face to hold an end of a fiber in optical contact with each end face.

2. A coupler according to claim 1, wherein a transparent material is arranged in the space between the flat facing surfaces of the main and branch lines.

3. A coupler according to claim 2, wherein the material is a liquid crystal material and wherein the coupler includes a first electrode disposed on the substrate and the second electrode disposed on the main and branch lines, said electrode covering the space between the facing surfaces of the main and branch lines.

4. A coupler according to claim 1, wherein the surface on the branch line extends at an angle to the main axis of the branch line so that the branch line has a wedge-shape in a plan view.

5. A coupler according to claim 4, wherein a transparent material is disposed between the spaced facing surfaces of the main and branch lines.

6. A coupler according to claim 5, wherein the transparent material is a liquid crystal material and wherein the coupler includes a pair of electrodes covering the space between the facing surfaces of the branch and main lines with one electrode being disposed on the substrate and the other of the pair of electrodes being disposed on the main and branch lines.

7. A coupler according to claim 1, wherein the main line has a square cross section.

8. A coupler according to claim 7, wherein the branch line has a portion with a square cross section and the flat surface extending at an angle to the axis of the branch line so that the branch line has a wedge-shaped configuration in a plan view.

9. A coupler according to claim 8, which includes a transparent material disposed in the space between the facing surfaces of the main and branch lines.

10. A coupler according to claim 9, wherein the transparent material is a liquid crystal material and wherein the coupler includes a pair of electrodes overlying the space containing the transparent material so that the optical characteristics of the material can be changed by the application of an electric field thereto.

11. A coupler according to claim 1, wherein the substrate has an index of refraction which is lower than the index of refraction of the material of the main and branch lines.

12. A method of producing a coupler for use with multi-mode glass fibers to couple-out and couple-in the light signal to the glass fibers; said coupler comprising a substrate, a main line having at least one flat surface, and at least one branch line having a flat surface, said main line and each branch line being disposed on the substrate with the flat surface of the branch line facing a flat surface of the main line in spaced parallel relationship thereto, said method comprising the steps of providing a substrate having an index of refraction lower than the index of refraction of a light sensitive material, applying a layer of said light sensitive material on said substrate, providing a mask corresponding to the configuration of the main line and branch line, exposing the layer of synthetic material, and developing the material to leave the coupler on said substrate with a spacing of a given distance extending between the parallel flat facing surfaces of the main and branch lines.

13. A method according to claim 12, which includes applying a transparent material between the parallel facing flat surfaces of the branch and main lines.

* * * * *